United States Patent
Chatterjee et al.

(10) Patent No.: US 11,288,165 B2
(45) Date of Patent: Mar. 29, 2022

(54) RULE-BASED CONTINUOUS DIAGNOSING AND ALERTING FROM APPLICATION LOGS

(71) Applicant: Oracle International Corporation, Redwood Shores, CA (US)

(72) Inventors: Raja Chatterjee, Nashua, NH (US); James Elder Weaver, Bailey, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/219,122

(22) Filed: Mar. 31, 2021

(65) Prior Publication Data

US 2021/0216432 A1 Jul. 15, 2021

Related U.S. Application Data

(63) Continuation of application No. 16/385,798, filed on Apr. 16, 2019, now Pat. No. 10,977,152.

(51) Int. Cl.
| | |
|---|---|
| *G06F 11/34* | (2006.01) |
| *G06F 9/448* | (2018.01) |
| *G06F 11/07* | (2006.01) |

(52) U.S. Cl.
CPC ........ *G06F 11/3476* (2013.01); *G06F 9/4498* (2018.02); *G06F 11/079* (2013.01)

(58) Field of Classification Search
CPC ............. G06F 11/0766; G06F 11/0775; G06F 11/0778; G06F 11/079; G06F 11/3476; G06F 11/3419; G06F 11/3438; G06F 9/4498; G06F 11/3072; G06F 11/3075
See application file for complete search history.

(56) References Cited

U.S. PATENT DOCUMENTS

| | | | |
|---|---|---|---|
| 10,885,167 B1 * | 1/2021 | Lador | G06N 20/00 |
| 2015/0101044 A1 * | 4/2015 | Martin | G06F 11/3006 726/22 |
| 2017/0031741 A1 | 2/2017 | Seigel | |
| 2017/0180187 A1 * | 6/2017 | Whitner | H04L 41/069 |
| 2019/0079818 A1 * | 3/2019 | Handa | G06F 11/0778 |
| 2019/0340057 A1 | 11/2019 | Brown et al. | |
| 2020/0125725 A1 | 4/2020 | Petersen et al. | |

* cited by examiner

*Primary Examiner* — Matthew M Kim
*Assistant Examiner* — Kurosu Risa Altaf
(74) *Attorney, Agent, or Firm* — Invoke

(57) ABSTRACT

One or more embodiments analyze log records of applications to determine whether a composite rule pertaining to events associated with the log records occurring within a specified time window are satisfied. Satisfaction of the composite rule may facilitate real-time diagnosis and detection of patterns in logs which indicate problems, threats, systemic issues, or performance issues relating to the applications. The composite rule may specify events associated with log records from multiple different applications that occur within a same specified time window and are associated with a same tenant and entity. Satisfaction of the composite rule may be analyzed by a state machine that tracks satisfaction of the individual rules within the composite rule in a sequence of stages. A notification, alert, or alarm may be generated when the composite rule is satisfied.

20 Claims, 4 Drawing Sheets

RULE-BASED CONTINUOUS DIAGNOSING AND ALERTING FROM APPLICATION LOGS

INCORPORATION BY REFERENCE; DISCLAIMER

The following application is hereby incorporated by reference: application Ser. No. 16/385,798 filed on Apr. 16, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to diagnostics performed based on logs stored from software applications. In particular, the present disclosure relates to a rule-based continuous diagnosing and alerting from application logs.

BACKGROUND

Application programs may record operational information, warnings, and error conditions in logs, e.g., log data files, to be later reviewed and analyzed to diagnose any issues or problems with operation of the application programs and/or to determine ways in which the application programs may be improved. The logs may document events that provide insight into various problems, threats, systemic issues, and performance issues associated with operation of the application programs, and various patterns related thereto. Each event recorded in the logs may include diagnostic information related to the event, including a time of occurrence of the event, a description of the event, and a user of the application program associated with the event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
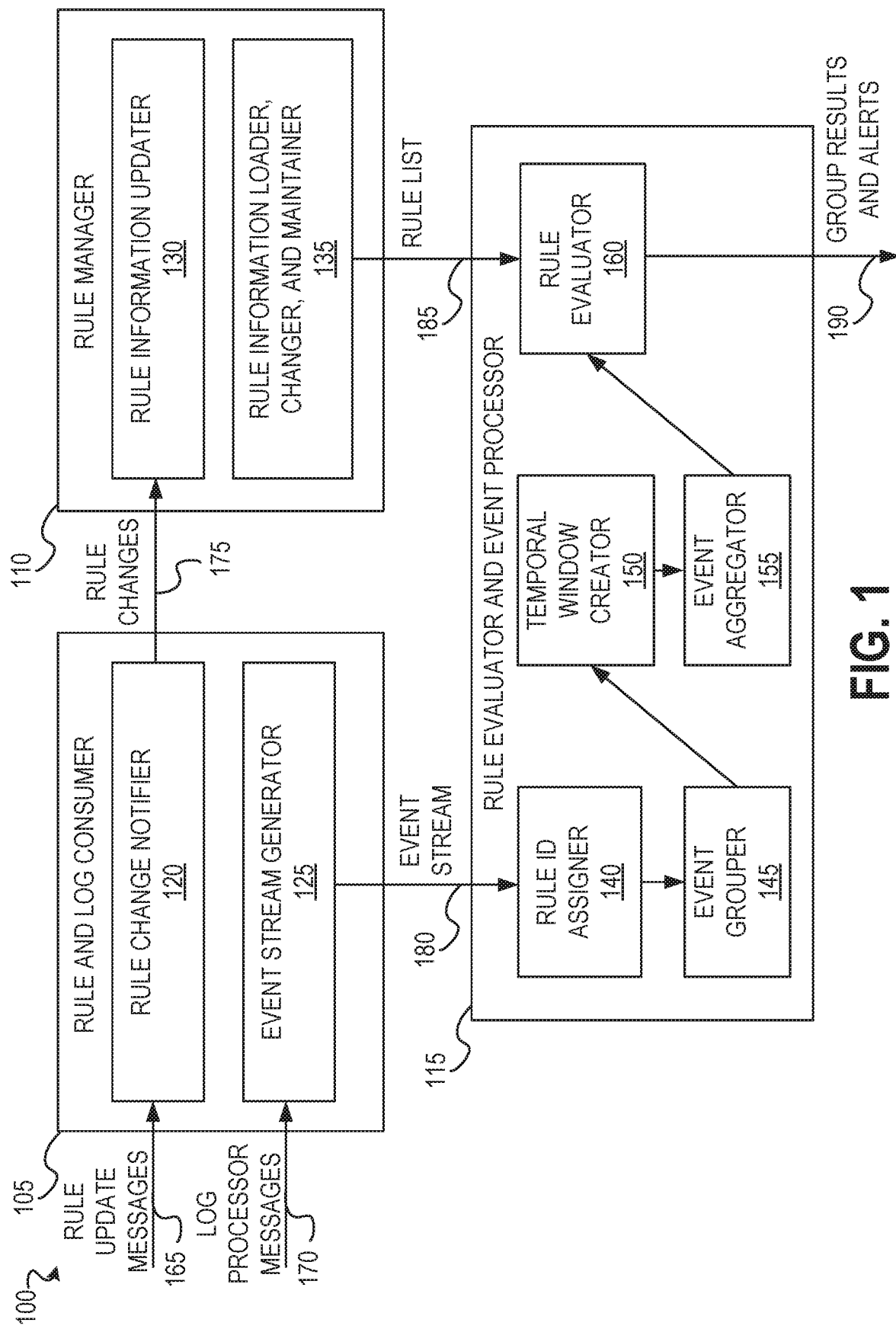
FIG. 1 shows a block diagram that illustrates a system for processing application logs according to composite rules in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

One or more embodiments determine whether composite rules are triggered based on data generated by multiple, different applications. The composite rule includes at least one rule corresponding to data associated with one application, and another rule corresponding to data associated with another, different application. The system identifies a subset of log records of multiple applications which correspond to a same entity and are associated with a same time window. to determine whether the composite rule has been triggered. Furthermore, the system evaluates the subset of log records to determine whether each rule in the composite rule is satisfied. If each rule in the composite rule is satisfied, the composite rule is triggered and a corresponding notification is generated.

This Specification may include, and the claims may recite, some embodiments beyond those that are described in this General Overview section.

2. ARCHITECTURAL OVERVIEW

A software application may store log records, e.g., warning or error messages, in log files on a disk or a network file system. The log records may be analyzed to determine the source of a problem, threats, systemic issue, or performance issue in the application that led to the storing of the log records. The source may be determined to be a problem or issue with the application software code, an environment in which the application is executing, a user error, an error with input data, or some other issue.

Various rules may be specified to control the analysis of the log records for determining the source of the problem or issue. The rules may be adapted over time in order to improve the analysis as more information is learned about the types of problems or issues that the software application encounters. For example, a user may edit rules definitions according to monitored application performance or for various other reasons, and new rules definitions may then be applied to analysis of new log records in real time. In some embodiments, multiple software applications may store their log records in a same shared log file. In other embodiments, multiple software applications may store their log records in different log files, but the different log files may be analyzed together. In these different embodiments, a composite rule (i.e., a group of rules) may be specified that are used to evaluate log records from multiple different software applications together to identify a single common source of the problem or issue.

The rules may be used to evaluate temporal events corresponding to the log records according to various patterns representing facts and states associated with the applications giving rise to the events. The facts and states may be used to detect problems, threats, system issues, and performance issues associated with the applications with which the facts and states are associated. The rules may also support identification of a baseline, trends, and anomalies in the application performance. Composite rules may be created to detect complex patterns involving one or more different applications within a given time window, by evaluating data from one or more different log files. The rules may include predicates on fields, values of fields, and mapping of fields associated with the events, e.g., based on domain predicates, field grouping, grouping functions, and/or threshold functions. After detection of problems, threats, issues, anomalies, etc., a notice, alert, or alarm may be issued along with the results of the analysis to facilitate corrective or compensatory action.

Rules may include the following examples:

Detecting a specific number of failed login attempts to an application program followed by a successful login for any user within a specific period of time. This may be indicative of a programmatic password hacking attempt.

Detecting a specific number of failed login attempts to multiple application programs for any user within a specific period of time. This may be indicative of a programmatic password hacking attempt.

Amount of downloaded data according to a specific variable is greater than a specific threshold within a specific period of time. The amount of downloaded data may be according to a specific user and/or a specific tenant across various specified applications the user and/or tenant uses. The amount of downloaded data per period of time may lead to network throughput issues and/or disk throughput issues, or other network or disk issues, so identifying the amount of downloaded data through a rule in advance of actual network or disk issues may proactively prevent application, network, and/or disk service downtime.

Correlating event patterns within a certain time window across member targets of complex applications by using multiple rules, with each rule targeting a different event pattern, and in some embodiments, a different application. The different rules within a composite rule may all apply for a same user and a same tenant as well as a same time window. In some embodiments, the multiple rules are to be satisfied simultaneously. In some embodiments, the multiple rules are to be satisfied in stages.

FIG. 1 shows a block diagram that illustrates a system 100 for processing application logs according to composite rules in accordance with one or more embodiments. The system 100 includes a rule and log consumer 105, a rule manager 110, and a rule evaluator and event processor 115. The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 may represent a single node of a scalable system that may be expanded to support a larger number of tenants and users. Each instance of the system 100 may be assigned to handle a given number or range of tenants, users, or rules, while additional tenants, users, or rules may be handled by additional instances of the system 100. If one instance of the system 100 that is assigned to handle a given number or range of tenants, users, or rules fails (e.g., goes down or crashes), one or more other remaining active instance of the system 100 may expand its range of handled tenants, users, or rules to compensate for the failed instance of the system 100.

A daemon may execute on a server to track a heartbeat signal from each of the executing instances of the system 100 to detect a failure of an instance of the system 100. When the daemon detects that an instance of the system 100 fails, the daemon may update an assignment mapping of the system 100 to tenants and rules so that the failed instance of the system 100 is compensated for by remaining instances of the system 100. When a replacement instance of the system 100 comes online to replace the failed instance of the system 100, the daemon may update the assignment mapping of the system 100 to tenants and rules so that the replacement instance of the system 100 effectively replaces the original failed instance of the system 100.

One or more instances of the system 100 may be periodically executed (e.g., every minute) to process logs stored since the previous triggering of one or more instances of the system 100. When the system 100 initially begins operations, each of the rule and log consumer 105, the rule manager 110, and the rule evaluator and event processor 115 may initialize. The rule and log consumer 105 may initialize by preparing to receive and process rule update messages 165 and log processor messages 170, for example, including establishing a source for receiving log processor messages 170 as a source for incoming events and a source for receiving rule update messages 165 as a source for rule changes. The event stream generator 125 may initialize the event stream 180 based on an initialized communication channel to receive the log processor messages 170. Initializing the event stream 180 may include initializing and assigning a time stamp. Initializing the event stream 180 may include assigning a watermark, e.g., specifying a source of the events in the event stream 180 based on a source of the log processor message 170. The rule manager 110 may initialize by the rule information loader, changer, and maintainer 135 loading and storing rules from a database or data file. The rule evaluator and event processor 115 may initialize by initializing a time clock to track times of events within the event stream 180 and by establishing a maximum delay allowed for processing events in the event stream 180.

A log processor (LP) may analyze one or more application logs, which may be stored and accessed as data files, to generate and send log processor messages 170 to the rule and log consumer 105. The LP may choose log files for analysis according to the stored rules if the log file includes a record having values for the fields in at least one of the rules to be evaluated. A log file chosen for analysis on this basis may be processed to generate a list of events for evaluation. The one or more application logs analyzed by the LP may be identified by a source or container that includes metadata identifying one or more logs to collect, or computer system ports for a computer system to monitor and store pertinent data therefrom to a log file. The metadata may specify the source of the log. The metadata may also specify parser and/or processing functions to process the one or more application logs. The parser and/or processing functions may generate a list of field and value pairs from raw, unstructured log records in the processed log file and output the list as log processor messages 170. The parser and/or processing functions may use regular expressions and/or field mappings to map specified content found in text of the log into field values. The parser and/or processing functions may essentially generate structured log records from input unstructured log records by finding embedded information in the unstructured log records, extract the embedded information, and apply filters to the extracted information to generate the structured information to output. The structured information to output may include a list of fields and field values.

A rule editing tool may create and update rules that specify complex pattern criteria across targets or complex applications for triggering notices, alarms, or alerts. One or more actions may be performed in response to one or more notices, alerts, or alarms. The user may specify metrics, threshold conditions, connectors, and aggregators for the rules and couple rules together into composite rules. Composite rules may couple events that are recorded in separate logs generated by separate applications, but within a common time window. In an example, by detecting certain anomalous conditions, corrective or compensatory action may be taken according to the user-specified rules. The rule editing tool may generate the rule update messages 165 in response to a user's creation and updating of the rules. The rules created and updated by the user may be used by the system 100 to detect patterns as specified by the user in logs generated by the user-specified applications.

The rule change notifier 120 may receive rule update messages 165 from a rule editing application that includes updates to rules. The updates to the rules may include additions to the rules, deletions of rules, and edits to the rules. The rule change notifier 120 may refresh a rule execution plan according to the received rule update messages 165. The rule change notifier 120 may process the updates to the rules and notify the rule manager 110 of the updates to the rules by sending rule changes 175 to a rule information updater 130 of the rule manager 110. The rule change notifier 120 may receive rule update messages 165 that effectively add or delete targets or applications that are considered by the rule evaluator and event processor 115. The rule changes 175 may be dynamically generated by the rule change notifier 120 and processed by the rule information updater 130 while the rule evaluator and event processor 115 is actively processing events generated from the log processor messages 170.

The rule information updater 130 may update or refresh a composite rule definition stored in a rule database according to the rule changes 175 received from the rule change notifier 120. An example of a composite rule definition format is shown below:

```
{
  "id" : "rule1",
  "service": "ServiceName",
  "evaluate" : {
    "filter" :
      <temporal filter>
      <domain filter on fields collected>
    "metric" :
      <grouping criteria>
    "event" : simple_event and/or composite_event
    composite_event: composite event FOLLOWED_BY simple_event
    simple_event:
      <grouping criteria>
      <threshold criteria>
  }
}
```

In the above composite rule definition, the name of a field is given in quotes before a colon, and the value of the field is given in quotes following the colon. In this example, the three fields of the rule definition are "id", "service", and "evaluate". The rule is defined to evaluate according to a filter, e.g., a temporal filter or a domain filter on collected fields. The rule is also defined to evaluate according to a metric, or a grouping criterion. Examples of a metric include a count, e.g., rows in a group per time window, a sum of a certain field value per group per time window, and/or a distribution of a count and/or a sum of certain fields per time window in different buckets. The rule is also defined to evaluate according to an event, e.g., a simple event or a composite event. A composite event may include another composite event followed by a simple event. The simple event may include a grouping criterion, and threshold criteria. The grouping criteria may specify a single field or multiple fields. The threshold criteria may be specified according to a count, e.g., rows in a group per time window, and/or a sum of a certain field value per group per time window.

A rule may be specified as a composite rule, including several separate rules that relate to one another for determining when the final composite rule condition is satisfied. For example, a composite rule may include rules that specify different target applications within a single time window for a tenant and a user. The composite rule may also specify a JOIN condition. The JOIN condition may specify a specific pattern criterion involving numerous different target applications that must be jointly satisfied in order for the composite rule to be satisfied. Events extracted from multiple different log files created by multiple different target applications may be evaluated in combination to determine that the JOIN condition is satisfied. The tenant may be implicitly specified as being equal for all JOIN criteria. The composite rule may facilitate detection of patterns across a number of different target applications through evaluation of events extracted from the different applications' application log files.

An example specification of a composite rule follows:

Composite rule containing multiple rules applicable to different target applications for a tenant:

```
RuleGroup 1
tw: x secs
from: {
  rule1
  rule2
  rule3
}
Join: 1 {
  cond: [{rule1.ecid = rule2.ecid}, {rule2. ecid = rule3.ecid}]
}
```

According to the above composite rule, each of the rules rule1, rule2, and rule3 must be satisfied within a same time window (tw) of x seconds in duration. The final condition of the composite rule may not be satisfied until all the conditions of all the individual rules within the composite rule are satisfied and the composite rule's JOIN condition is satisfied. As shown, the JOIN condition enforces that the execution context ID (ECID) of the threads associated with the events and each associated satisfied rule are equal. The rule evaluator 160 may evaluate each rule in the composite rule in parallel, or co-temporally.

Examples of temporal composite rules to be applied to fields extracted and/or abstracted from collected logs follow.

Following is an example specification of a rule for matching conditions in which ORA-600>5 is matched within the previous 20 seconds:

```
timeWindowBasedORA600ErrorCount= {
  "name" : "Label Count By Time Window",
  "service" : "LogAnalytics",
  "evaluate" : {
    "filter" : {
      "timeWindow" : "20",
      "predicate" : {
        "field" : "label",
        "operator" : "=",
        "value" : "ORA-600"
      },
      "event" : {
        "groupBy" : {
          "fields" : ["label"]
        },
        "countThreshold" : 5
      }
    }
  }
}
```

Following is an example of a rule for matching conditions in which a size of SUM(downloadedBytes)>2 GB is matched within the previous 30 seconds across all logs related to a download per user:

```
timeWindowBasedDownloadedBytesSum= {
  "name" : "DownloadedBytes Sum By Time Window",
  "service" : "LogAnalytics",
  "evaluate" : {
    "filter" : {
      "timeWindow" : "30",
      "predicate" : {
        "field" : "label",
        "operator" : "=",
        "value" : "Download"
      },
      "event" : {
        "groupBy" : {
          "fields" : ["user"]
        },
        "groupFunction" : SUM(downloadedBytes)
        "sumThreshold" : 2000000000 (i.e. >2GB)
      }
    }
  }
}
```

The rule information updater 130 may also update or refresh a rule execution plan stored in the rule database according to the rule changes 175 received from the rule change notifier 120. The rule execution plan stored in the rule database may include metadata corresponding to the rules associated with the rule changes 175, as well as all associated tenants, rule names, applications, functions, grouping criteria, grouping functions, threshold functions, temporal predicates, domain predicates, fields, and values. In an embodiment, the metadata may be represented in a text format such as JavaScript Object Notation (JSON).

The event stream generator 125 may receive the log processor messages 170 from the LP that processes one or more application logs. The event stream generator 125 may generate event streams 180 based on the log processor messages 170 and send the event streams 180 to the rule evaluator and event processor 115. The event stream 180 may include a time sequence of field and value pairs collected from the log processor messages 170 for streaming to the rule evaluator and event processor 115. The event stream 180 may be represented as a data structure having the following properties:

Tenant
Target
List of rules: the list of rules that can be applied to the event
Map {string, string}: key values for the event
Log type
Rule ID: initially unpopulated
Time stamp: time on source system when an event is created
Event ID: optional; used to track each event
Window ID: optional; set when an event is collected in a time window to a unique ID of that window instance The rule information loader, changer, and maintainer 135 may process the rules stored in the rule database of the rule manager 110 to create a rule list 185 to the rule evaluator and event processor 115. The rule list 185 may include a list of the rules to be processed by the rule evaluator and event processor 115 and applied to the events included in the event stream 180. The rule list 185 may be represented as a data structure having the following properties:

Name: name of the current rule
Time window duration
Group By
Count
Filter (predicate)
Followed By List: a list of other rules in sequence following the current rule The rule evaluator and event processor 115 includes a rule ID assigner 140, an event grouper 145, a temporal window creator 150, an event aggregator 155, and a rule evaluator 160. The rule evaluator and event processor 115 processes the event stream 180 according to the rules defined and implemented according to the rule update messages 165 and included in the rule list 185. The rules may be applied according to a mapping between the fields of the log records and the rules. The rule evaluator and event processor 115 may detect patterns and application states of interest in the event stream 180 according to the implemented rules to generate group results and alerts 190, e.g., time series metrics. The group results and alerts 190 may trigger additional processes or actions, e.g., conducting a root cause analysis based on one or more log records that led to the generation of the group results and alerts 190. Another process or action that may be triggered is deactivating a login user id in the event that a specified number of failed login attempts occur within a specified period of time in a specified target application or applications, according to rules specified in a composite rule.

The rule ID assigner 140 may populate a list of rule IDs mapped to events, e.g., processed log record field and value pairs from the event stream 180, that are relevant to the rules from the rule list 185 that are associated with the mapped rule IDs. The rule ID for the incoming event may be undefined or null. The rule ID assigner 140 may replicate events as appropriate so that each rule ID that matches an event is uniquely matched to an instance of the matched event and assign the rule ID to the matched instance of the event. In instances in which an event lists a single rule in the associated list of rules, the rule ID assigner 140 may assign a rule ID to the event to correspond with the single rule listed in the event. In an embodiment, an event may be replicated for each tenant and/or user of the system 100. In an embodiment, a separate instance of the system 100 may execute for each tenant and/or user, thereby facilitating an event to be replicated for each tenant and/or user of the system 100.

Because the rule ID assigner 140 assigns rules to the events of the incoming event stream 180 on an ongoing basis, any changes to the rules in the rule list 185 that occur over time may be dynamically applied to the events in the event stream 180 during processing of the event stream 180 by the rule evaluator and event processor 115. Likewise, any changes to the targets or applications to which the rules are applied that occur over time may be dynamically applied to the events in the event stream 180 during processing of the event stream 180 by the rule evaluator and event processor 115. The rule evaluator and event processor 115 may thus effectively maintain different versions of rules mapped to distinct evaluation cycles, and the mapping of the rules to the events may evolve over time during processing of the event stream 180.

For example, an incoming event included in the event stream 180 may include an identified tenant, and identified target, a log type associated with the event, and a list of multiple rules that apply to the event. The rule ID assigner 140 may replicate the incoming event in order assign a unique rule ID to each replicated event that uniquely corresponds to one of the rules in the list of multiple rules. Each of the replicated events may continue to list the rules originally listed in the incoming event. The rule ID assigner 140 may output a single stream including the replicated events along with non-replicated events to the event grouper 145.

The event grouper 145 may group all events within the event stream 180 according to a defined grouping criterion so that state management can be performed according to tenant, target, user, rule, and/or sub-group keys. The event grouper 145 may take as input a single event stream from the rule ID assigner 140 and output multiple event streams, one event stream per group, to the temporal window creator 150. The grouping criteria may be defined as the tenant, target, user, and/or rule. The grouping of the events into different event streams according to tenant, target, user, and rule may facilitate the rule evaluator 160 evaluating each rule in a composite rule in parallel, or co-temporally.

The temporal window creator 150 may define one or more tumbling temporal windows, e.g., periods of time during which events within the event stream 180 may be processed, according to the rules in the rule list 185 and the time stamps associated with each of the events included in the grouped event streams received from the event grouper 145. For example, a rule may be specified according to events that occur within a specific period of time, e.g., 20 seconds. The temporal window creator 150 may then create a new tumbling temporal window for each 20 second period of time in which an event in the input event streams has a defined time stamp. Each tumbling temporal window does not overlap with prior or subsequent tumbling temporal windows. The temporal window creator 150 may then pass the event streams received from the event grouper 145 and a list or stream of created tumbling temporal windows to the event aggregator 155. In an embodiment, a separate tumbling temporal window may be defined for each tenant and/or user associated with the events.

The event aggregator 155 may assign or map events within the grouped event streams output by the event grouper 145 and passed along by the temporal window creator 150 to particular tumbling temporal windows defined by the temporal window creator 150. The events may be sorted according to the time of occurrence within each tumbling temporal window that they are assigned. After the assignment or mapping, each of the tumbling temporal windows created by the temporal window creator 150 may include a list of events that occur within a specified period of time. A separate set of events may be aggregated and associated with each of a plurality of separate temporal tumbling windows. The list of events aggregated into each tumbling temporal window may be sorted according to their time stamps. The mapping of the events to the tumbling temporal windows may be forwarded to the rule evaluator 160.

The rule evaluator 160 may evaluate the events included in the mapping of the events to the tumbling temporal windows received from the event aggregator 155 by applying the rules from the rule list 185 that are identified in the individual events. The rule evaluator 160 includes a state engine that maintains a state of meeting multiple conditions of a composite rule prior to meeting a final condition of the composite rule that leads to generating a notice, alert, or alarm that the rule conditions have been satisfied. The state engine may count the times that each rule condition that builds toward a final rule condition is met by incrementing one or more accumulators associated with the rule specifying the condition. Each time a rule condition is met that contributes toward meeting a final rule condition, the rule evaluator 160 may record a stage of the rule's satisfaction as being advanced within a state memory associated with the rule. The rule evaluator 160's advancement of a stage of the rule's satisfaction is equivalent to operation of a state machine, for example, advancing from a first state to a second state. The composite rule may specify an effective state machine having one, two, three, or more states, with each state being reached after a rule condition that facilitates advancing from the previous state is satisfied. The rule evaluator 160 may also store each event that contributes toward meeting a rule condition in the rule's state memory in association with the event's tenant, target application, and user. A number of stages in a rule between a first condition being met and a final condition being met depends upon the rule definition. For example, a rule that requires five login failures by a user for a target application followed by a successful login to the target application by the user within a thirty second window may have two stages, one stage for counting the login failures and a second stage for counting the successful login. There may be an accumulator for each stage that is used to count the respective events until a number needed to advance from one stage to another stage are reached.

When an evaluated event breaks a rule condition that prevents the rule from meeting a final rule condition, the rule evaluator 160 may reset the stage of the rule's satisfaction and all associated accumulators and memory locations within the state memory associated with the rule to a beginning state. The rule evaluator 160 may also store a time of occurrence of the event that satisfies the first rule condition to reach the first stage, the most recent event that satisfies a rule condition to reach the current stage, and/or a time of occurrence of any events that satisfied a rule condition to reach any intermediate stages. By referencing the time of occurrence of the first event and the most recent event that met the current rule conditions, the rule evaluator 160 may determine that all the events that meet the current rule conditions occurred within the required period of time. If the rule evaluator 160 processes a successive sequence of events that meet rule conditions pertaining to the same target by the same user, and a newly processed event makes a first processed event stored in the rule's state memory no longer needed or relevant to satisfying the rule's final condition, the rule evaluator 160 may record information in the rule's state memory relating to the most recent sequence of events that meet rule conditions and contribute toward satisfying the rule's final condition and delete any reference to the first recorded event to meet a rule condition that is no longer needed or relevant to satisfying the rule's final condition. A sliding temporal window to encompass all events that contribute to a rule's satisfaction of a final condition facilitates recognition of a series of events that meet a rule's final condition that straddle a boundary between multiple tumbling temporal windows and that are processed in different temporally separated event streams. Also, if all occurrence times of events that lead to meeting rule conditions that are recorded in the rule's state memory are older relative to the occurrence time of the event currently being processed, the rule evaluator 160 may delete and/or reset all references to the recorded events in the rule's state memory and reset the rule's stage to a beginning stage in the rule's state memory.

For example, a composite rule may specify that five login failures by a user for a target application followed by a successful login to the target application by the user within a thirty second window is necessary for the rule to be satisfied and for an alert or alarm to be issued. When a specific user unsuccessfully attempts to log into a specific application, the attempt is recorded in a log for the specific application and is reflected in an event being processed by the rule evaluator 160. The user may fail to log in three times in a row. Each time an event is evaluated that records a failed login attempt by the same user to the same application according to the composite rule identified by the event, the rule evaluator 160 may advance a stage of satisfying the rule's requirements by incrementing an accumulator in the rule's state memory that tracks a number of successive failed login attempts by the user into the application and/or incrementing an accumulator that keeps track of the stage of satisfying the rule's requirements. If the user next successfully logs into the same application, the rule evaluator 160 may clear the state memory in the rule's state memory to reset the rule's state to the beginning with no recorded failed login attempts, because there is no longer any progress toward meeting the rule's condition of five successive failed login attempts by the user into the application followed by a successful login attempt. If the rule evaluator 160 processes a successive sequence of six failed login attempts to the application by the same user, the rule evaluator 160 may record information in the rule's state memory relating to the most recent five failed login attempts and delete any reference to the first failed login attempt because the first failed login attempt no longer contributes to satisfaction of the rule's final condition, but the most recent five failed login attempts do contribute toward satisfaction of the rule's final condition.

The rule evaluator 160 may process the rules according to metadata associated with the rules. The rule evaluator 160 may initialize a runtime rule data structure for each rule based on a rule definition included in the rule list 185. An exemplary runtime rule data structure may include the following methods:

Group By: takes an event as input, outputs a string result
Filter: takes an event as input, outputs a boolean result
Collect Alarms: takes functions for aggregating events into windows and an alert collector as inputs An alarm or alert data exemplary data structure may include the following properties:

Rule Name
Created Time
Event List: a list of events that cause the alarm

For each tumbling temporal window having events to be processed by evaluating rules, the rule evaluator 160 may eliminate any events that are not matched or assigned to any rules in the rule list 185. The rule evaluator 160 may also group events together according to various characteristics of the events, e.g., characteristics matched by rules in the rules list 185. The rule evaluator 160 may sort event groups according to various criteria defined by the associated rules in the rule list 185. For each rule being evaluated, the rule evaluator 160 may perform a function defined by the rule on the events in the group of events and output results associated with the function in the group results and alerts 190.

The functions performed by the rule that the rule evaluator 160 is evaluating may include counting, pattern matching, or grouping functions such as summing, averaging, or threshold evaluation, for example. In various embodiments, the group results and alerts 190 may include measurement rows or metrics representing count, sum, and/or average results per tenant, user, rule, and/or group on a periodic basis per temporal window for reporting, trending, and anomaly detection. The group results and alerts 190 may also provide threshold alerts when a threshold condition is satisfied, e.g., count>x, or sum of bytes collected for logs having a label called "Upload">x, or average>x, or a predetermined pattern is present in a list of events, e.g., five failed login attempts followed by a successful login attempt within a specified period of time in a specific application for a particular tenant.

In an embodiment, the rule evaluator 160 may apply a predicate of a rule in the rule list 185 associated with an event in the mapping received from the event aggregator 155 to the event. If the application of the predicate returns a true result, the rule evaluator 160 may apply a combine function provided as part of the rule to the same event and a current value of an accumulator. The result of the combine function may be stored in the accumulator. The rule evaluator 160 may then evaluate the value of the accumulator in comparison with a threshold condition that is applied to the accumulator and independent of the rule list 185. The accumulator may be reset at the beginning of the processing of all the rules in the rule list 185 and events in the event stream 180. If the rule evaluator 160 finds that the value of the accumulator meets the threshold condition, then the rule evaluator 160 may determine that the current rule being evaluated in conjunction with the current event is satisfied. Once evaluation of the current event is complete, the next event in the mapping of events to temporal windows may be evaluated by evaluating the rule associated with the event. If there are no further events to be evaluated in the current temporal window, then the rule evaluator 160 may issue group results and alerts 190 corresponding to the current temporal window.

As an example, consider a rule that is triggered when there are six failed attempts for a user to log into an application within a five minute period of time. The event stream generator 125 may generate an event in the event stream 180 for each logged login attempt with a result of success or failure along with a time stamp for the login attempt. The rule ID assigner 140 may assign a rule ID identifying the rule. A runtime data structure generated by the rule evaluator and event processor 115 associated with the rule may include a function that counts a number of times a login attempt for a single user fails within a specified period of time, in this case, five minutes, and store the result in an accumulator memory address within the runtime data structure. The temporal window creator 150 may create tumbling temporal windows based on the rule identified in each event, so that a series of five-minute tumbling temporal windows are created. The event aggregator may assign each event to one of the tumbling temporal windows according to the time stamp associated with each event. The rule evaluator 160 may process the rule and execute the function associated with the rule's runtime data structure when processing each of the events that identifies the rule. When the rule evaluator 160 processes the rule, the rule's function may output an alarm via the group results and alerts 190 when the number of login attempts within the specified time window reaches the specified number, in this case, six. The rule evaluator 160 may reset the accumulator in the rule's runtime data structure when a successful login occurs or when a time window expires without reaching the required number of failed login attempts.

In various embodiments, multiple instances of the system 100 may be executed simultaneously in parallel with one another while operating on a different time period for log processor messages 170. Thus, different instances of the system 100 that are concurrently executing may upload log processor messages 170 from different time periods and analyze the log processor messages 170 simultaneously in parallel. The multiple instances of the system 100 that execute simultaneously in parallel may also support different tenants or groups of tenants, lists of targets or complex applications, and/or sets of rules. Thus, each instance of the rule evaluator and event processor 115 may process only a certain range of tenants, targets, and/or rules. As a number of tenants, targets, or rules grow, additional instances of the system 100 or rule evaluator and event processor 115 may be added to handle the growing number of tenants, targets, or rules. When an additional instance of the system 100 or rule evaluator and event processor 115 begins execution, some workload from one or more other instances of the system 100 or rule evaluator and event processor 115 may be transferred to the additional instance. When one instance of the system 100 or rule evaluator and event processor 115 goes down or ceases to function, the tenants, targets, or rules handled by that instance may be redistributed to other remaining executing instances of the system 100 or rule evaluator and event processor 115.

3. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 2:
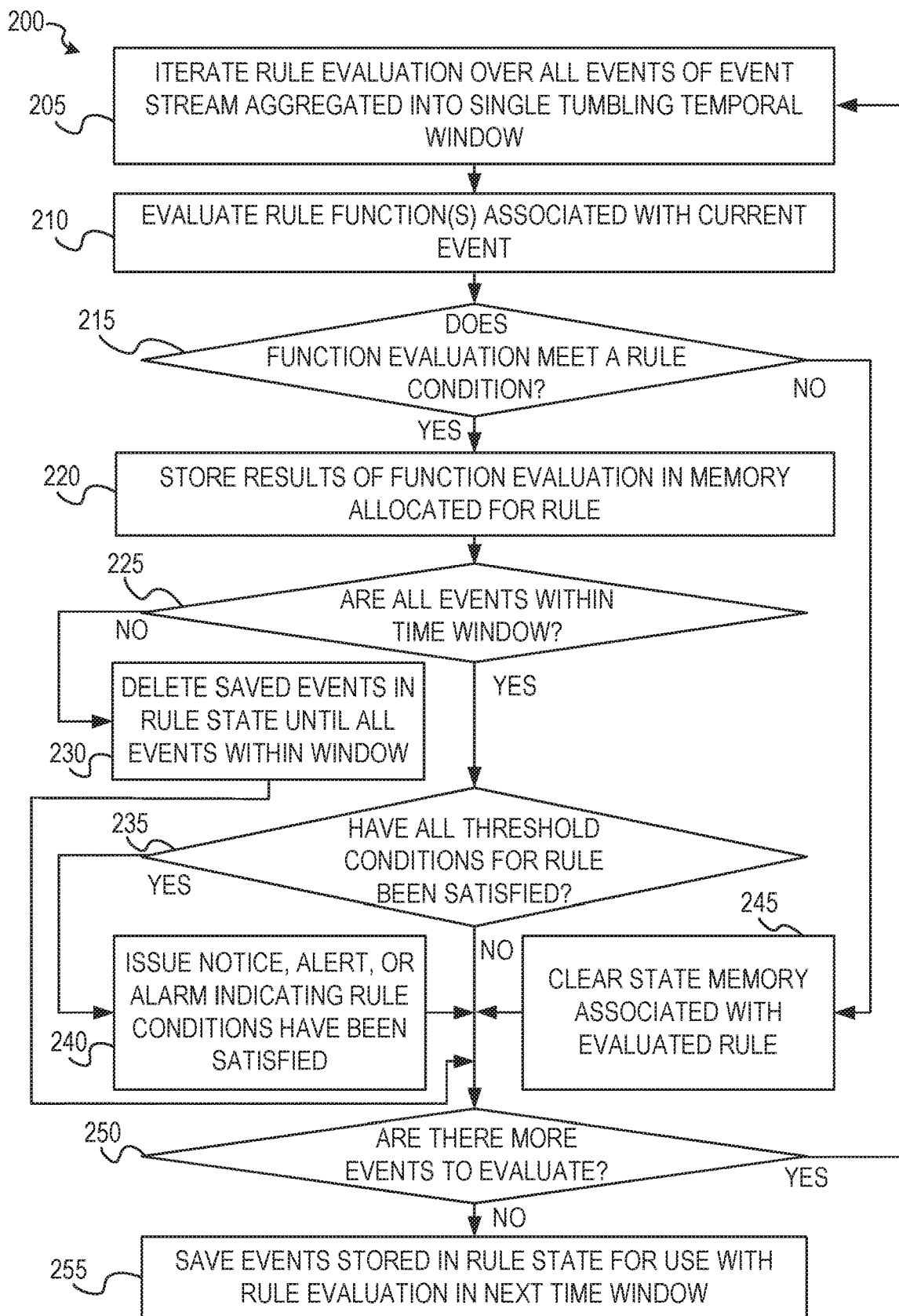
FIG. 2 shows a block diagram that illustrates an example set of operations for evaluating rules performed by a rule evaluator in accordance with one or more embodiments.

FIG. 2 shows a block diagram that illustrates an example set of operations 200 for evaluating rules performed by the rule evaluator 160 in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an operation 205, the rule evaluator 160 begins an iteration over all events of an input event stream aggregated into a single tumbling temporal window by the event aggregator 155. The goal of the iteration over the events of the input event stream is to evaluate the rules associated with the events and determine when conditions applicable for a rule are satisfied. During the first execution of operation 205 for an iteration over a specific tumbling temporal window, the rule evaluator 160 may initialize the iteration over the events of the input event stream by initializing time counters, variables, rule states, and settings for the events of the input event stream. During the first execution of operation 205, a first event of all the events of the input event stream is taken as the current event to be processed by the following operations within the iteration. During the second and subsequent executions of operation 205 in the iteration, a next event of the input event stream is taken as the current event to be processed.

In an operation 210, the rule evaluator 160 evaluates one or more functions specified by the rule identified by the current event. The rule evaluator 160 may store results from evaluating the functions in variables and/or rule states associated with the rule that specifies the evaluated functions. The rule evaluator 160 may also update a time counter associated with a stored state of the rule identified by the current event according to a time stamp of the current event.

In an operation 215, the rule evaluator 160 determines whether the one or more functions evaluated in operation 210 meet a rule condition specified by the rule corresponding to the event. For example, if a rule requires four failures followed by one success, there may be a stage associated with the four failures required by the first rule and a next stage associated with the one success required by the second rule. A rule condition for the first rule may be that a login attempt is a failure, while a rule condition for the second rule may be that a login attempt is a success. There may also be a threshold condition needed to advance from the first stage to the next stage of the rule that may be compared against the results of operation 210. For example, the threshold condition to advance from the first stage to the second stage may be four failures in a row within the specified time window. The rule conditions applicable to one stage may not be applicable to another stage. For example, in the first stage counting successive login failures, a login success would not be considered to meet a rule condition. However, in the second stage counting login successes, a login success would be considered to meet a rule condition. Each failure or success in the proper sequence may be counted in respective accumulators in the stored state of the rule, and a value of the respective accumulator meeting the threshold condition may be considered as meeting a rule condition to advance from the first stage to the next. If a rule condition is met, operation 220 is performed. Otherwise, operation 235 is performed.

In an operation 220, the rule evaluator 160 may store the results of the function evaluation of operation 210 in one or more memory locations allocated for the stored state of the rule associated with the one or more functions evaluated in operation 210. The event evaluated may also be stored in the memory locations allocated for the rule. For example, if a rule requires four failures followed by one success, there may be a stage associated with each of the four failures and one success, and an accumulator may keep track of the stage reached to meet the conditions of the overall rule. For example, where a rule specifies that a set number of failures to log into an application must occur within a specified time window in order for the rule to be satisfied, each failure within the specified time window may be added to an accumulator designated for counting the failures when the failure event satisfies the rule. For a complex composite rule, e.g., a composite rule that specifies numerous steps or stages that must be satisfied in order for the composite rule to be satisfied, a result of evaluating the one or more functions may be stored in one or more respective accumulators in the stored state of the evaluated rule. The memory locations stored in the state for the evaluated rule may facilitate ensuring that a specified sequence of predicates applying a function of the rule have the required values in the required sequence until a specified threshold value associated with the rule is met before the rule is designated as having been satisfied and a stage is advanced.

In an operation 225, the rule evaluator 160 determines whether all events, of the stored events in the memory allocated for the current rule and the currently evaluated event, are within the same time window as required by the rule. If the events are all within the same time window, operation 235 is performed. If the events are not all within the same time window, operation 230 is performed. Whether the events are within the same time window may be determined by comparing an occurrence time of the temporally first event stored in the state memory associated with the rule and an occurrence time of the currently evaluated event.

In an operation 230, the rule evaluator 160 deletes stored events in the state memory allocated for the current rule starting with the earliest events until all stored events and the currently evaluated event are within the same time window. When stored events are deleted, the rule evaluator 160 may correspondingly adjust variables in the state memory associated with the rule that indicate the number of stored events and the number of stages completed prior to fully satisfying the current rule's conditions. If there are no stored events, then no deleting of stored events may occur. The rule evaluator 160 may also clear other state memory associated with the current rule, including resetting counters, variables, and settings for the iteration over any remaining events aggregated into the single time window. After operation 230, operation 250 may be performed.

In an operation 235, the rule evaluator 160 determines whether the one or more threshold conditions for the complete rule to be satisfied have been met. For example, if a composite rule is satisfied when there have been six failed login attempts followed by one successful login attempt within a five minute period of time, the rule evaluator 160 will determine whether the accumulators counting the failed login attempts and the successful login attempts during the current five minute tumbling time window have reached the threshold values in the proper sequence required by the composite rule. If the threshold conditions have been determined to be satisfied, operation 240 will be performed. If the threshold conditions have been determined to not be satisfied, operation 250 will be performed.

In an operation 240, the rule evaluator 160 issues a notice, alert, or alarm indicating that the rule conditions have been satisfied. The issued notice, alert, or alarm may include the group results and alerts 190. The rule evaluator 160 may also reset counters, variables, rule states, and settings for the iteration over any remaining events aggregated into the single tumbling temporal window in the input event list. The rule evaluator 160 may treat any remaining events in the input event list as if there were no prior events in the event stream processed by the rule evaluator 160. The rule evaluator 160 may therefore issue multiple notices, alerts, or alarms within a single tumbling temporal window for a single event stream when the separate sets of evaluated events within the tumbling temporal window for the single event stream match the threshold conditions.

In an operation 245, after determining that an event did not meet a rule condition in operation 215, the rule evaluator 160 clears the state memory associated with the evaluated rule so that the rule may be evaluated anew with the next event in the list of events to be evaluated that is associated with the rule. By clearing the state memory, the rule may be evaluated starting with the first stage of a multi-stage rule condition for the next event in the iteration. For example, a rule may require four failures followed by one success within a one minute time window, and so far two failures may have been evaluated and recorded in the state memory associated with the rule. If the next event is a success, then the rule condition would have been determined to not be met in operation 215. After clearing the state memory for the rule in operation 235, the next event evaluated in association with the presently evaluated rule may be considered to meet the rule condition if the event is evaluated to be a failure and not meet the rule condition if the event is evaluated to be a success.

In an operation 250, the rule evaluator 160 determines whether there are more events to evaluate within the input event stream, or whether the iteration is complete. If there are more events to be evaluated, operation 205 is performed to continue the iteration over the events. If not, operation 255 is performed.

In an operation 255, the rule evaluator 160 may save any events currently stored in the state memory associated with the currently evaluated composite rule in the state memory associated with the currently evaluated composite rule for the rule evaluator 160 to consider during the next iteration over events associated with a next time window. The rule evaluator 160 may store variables indicating how many rule conditions were met by the saved events and both a time stamp and an event within the event list indicating where the event evaluation process left off. By keeping track of events that did not meet a final threshold rule condition of the currently evaluated rule in the currently evaluated tumbling temporal window to be considered when evaluating events associated with the same rule in the next tumbling temporal window, any rules whose conditions are met by a combination of events that are assigned to two neighboring tumbling temporal windows may be identified as being satisfied.

In an example, a list of events in an event stream are associated with a composite rule that is triggered when there are two failed login attempts for a user of an application followed by a successful login attempt within ten seconds. A first rule in the composite rule is satisfied by a failed login attempt in a first stage, while a second rule in the composite rule is satisfied by a successful login attempt in a second stage. A first event in the list of events may indicate a failed login attempt at five seconds, a second event in the list of events may indicate a failed login attempt at six seconds, and a third event in the list of events may indicate a successful login attempt at seven seconds. Upon evaluating the first event (operation 210), the rule evaluator 160 determines that the first rule condition is satisfied by the first event (operation 215). Then the rule evaluator 160 stores the first event in the state memory of the composite rule, sets an accumulator to indicate that a first stage is reached, and sets another accumulator to indicate that one failed login attempt has been counted in the first stage (operation 220). Because all conditions of the composite rule have not been satisfied (operation 235), and there is a second event to evaluate (operation 250), the rule evaluator 160 evaluates the second event next (operation 210). Upon evaluating the second event, the rule evaluator 160 determines that the rule condition of the first rule is satisfied by the second event (operation 215), as well as the threshold required to advance from the first stage to the second stage of the composite rule. Then the rule evaluator 160 stores the second event in the state memory of the composite rule, sets an accumulator to indicate that a second stage is reached (operation 220), and increments the accumulator counting the failed login attempts in the first stage. Because all conditions of the composite rule have not been satisfied (operation 235), and there is a third event to evaluate (operation 250), the rule evaluator 160 evaluates the third event next (operation 210). Upon evaluating the third event, the rule evaluator 160 determines that the second rule's condition is satisfied by the third event (operation 215). Then the rule evaluator 160 stores the third event in the state of the composite rule, an accumulator is set to indicate that one successful login attempt has been recorded in the second stage, and the stage counting accumulator is advanced to indicate that a third stage (e.g., completion of the second stage) is reached (operation 220). Because all conditions of the composite rule have now been satisfied (operation 235), the rule evaluator 160 issues a notice, alert, or alarm indicating that that rule conditions have been satisfied and all the stored events and associated variable and accumulator values are reset (operation 240). The events that contributed to meeting the composite rule's final condition may be output along with the notice, alert, or alarm before being erased from the composite rule's state memory. Because there are no more events in the event list to evaluate (operation 250), and there are no remaining events in the state memory for the composite rule, no events are saved (operation 255) and the process ends.

In an example, a list of events in an event stream are associated with a composite rule that is triggered when there are two failed login attempts for a user of an application followed by a successful login attempt within ten seconds. A first rule in the composite rule is satisfied by a failed login attempt in a first stage, while a second rule in the composite rule is satisfied by a successful login attempt in a second stage. A first event in the list of events may indicate a failed login attempt at five seconds, a second event in the list of events may indicate a successful login attempt at six seconds, a third event in the list of events may indicate a failed login attempt at seven seconds, a fourth event in the list of events may indicate a failed login attempt at eight seconds, and a fifth event in the list of events may indicate a successful login attempt at nine seconds. Upon evaluating the first event (operation 210), the rule evaluator 160 determines that the first rule's condition is satisfied by the first event (operation 215). Then the rule evaluator 160 stores the first event in the state memory of the composite rule, sets an accumulator to indicate that a first stage is reached, and sets another accumulator to indicate that one failed login attempt has been counted in the first stage (operation 220). Because all conditions of the composite rule have not been satisfied (operation 235), and there is a second event to evaluate (operation 250), the rule evaluator 160 evaluates the second event next (operation 210). Upon evaluating the second event, the rule evaluator 160 determines that the rule condition of the first rule is not satisfied by the second event (operation 215). Because the rule condition is not satisfied, the rule evaluator 160 deletes the stored event from the state memory of the composite rule and clears the associated variables and accumulators (operation 245). The rule evaluator 160 then determines that there is a third event in the event list to evaluate (operation 250). Then the rule evaluator 160 evaluates the third event next (operation 210). Upon evaluating the third event, the rule evaluator 160 determines that the first rule condition is satisfied by the third event (operation 215). Then the rule evaluator 160 stores the third event in the state memory of the composite rule, sets an accumulator to indicate that a first stage is reached, and sets another accumulator to indicate that one failed login attempt has been counted in the first stage (operation 220). Because all conditions of the composite rule have not been satisfied (operation 235), and there is a fourth event to evaluate (operation 250), the rule evaluator 160 evaluates the fourth event next (operation 210). Upon evaluating the fourth event, the rule evaluator 160 determines that the rule condition of the first rule is satisfied by the fourth event (operation 215), as well as the threshold required to advance from the first stage to the second stage of the composite rule. Then the rule evaluator 160 stores the second event in the state memory of the composite rule, sets an accumulator to indicate that a second stage is reached (operation 220), and increments the accumulator counting the failed login attempts in the first stage. Because all conditions of the composite rule have not been satisfied (operation 235), and there is a fifth event to evaluate (operation 250), the rule evaluator 160 evaluates the fifth event next (operation 210). Upon evaluating the fifth event, the rule evaluator 160 determines that the rule condition of the second rule is satisfied by the fifth event (operation 215). Then the rule evaluator 160 stores the fifth event in the state memory of the composite rule, sets an accumulator to indicate that one successful login attempt has been recorded in the second stage, and increments an accumulator to indicate that a third stage (e.g., completion of the second stage) is reached (operation 220). Because all conditions of the composite rule have now been satisfied (operation 235), the rule evaluator 160 issues a notice, alert, or alarm indicating that the composite rule conditions have been satisfied and all the stored events and associated variable and accumulator values are reset (operation 240). The events that contributed to meeting the composite rule's final condition may be output along with the notice, alert, or alarm before being erased from the composite rule's state memory. Because there are no more events in the event list to evaluate (operation 250), and there are no remaining events in the state memory for the composite rule, no events are saved (operation 255) and the process ends.

In an example, a list of events in an event stream are associated with a composite rule that is triggered when there are two failed login attempts for a user of an application followed by a successful login attempt within ten seconds. A first rule in the composite rule is satisfied by a failed login attempt in a first stage, while a second rule in the composite rule is satisfied by a successful login attempt in a second stage. A first event in the list of events may indicate a failed login attempt at five seconds. There are no other events in the list of events for the current tumbling temporal window. Upon evaluating the first event (operation 210), the rule evaluator 160 determines that the first rule's condition is satisfied by the event (operation 215). Then the rule evaluator 160 stores the first event in the state memory of the composite rule, sets an accumulator to indicate that a first stage is reached, and sets another accumulator to indicate that one failed login attempt has been counted in the first stage (operation 220). Because all conditions of the rule have not been satisfied (operation 235), and there are no more events in the event list to evaluate (operation 250), the rule evaluator 160 saves the event stored in the state memory of the composite rule (operation 255) and the set of operations 200 of FIG. 2 ends.

Continuing the present example, the set of operations 200 of FIG. 2 then begin anew with the next temporal tumbling window, and the composite rule still stores or is restored to store the event saved in the state memory of the composite rule during the last execution of the set of operations 200, along with the corresponding variable and accumulator values that correspond to the saved event. A first event in the list of events for the next tumbling temporal window may indicate a failed login attempt at six seconds, and a second event in the list of events may indicate a failed login attempt at seven seconds. Upon evaluating the first event (operation 210), the rule evaluator 160 determines that the first rule's condition is satisfied by the first event (operation 215), as well as the threshold required to advance from the first stage to the second stage of the composite rule, because the first rule's condition was previously satisfied by the remaining previously evaluated event stored in the state memory of the composite rule and the accumulator used to count the number of successive failed login attempts that meet the first rule's condition indicates that one failed login attempt has already been recorded. Then the rule evaluator 160 stores the first event in the state memory of the composite rule, sets an accumulator to indicate that a second stage is reached (operation 220), and increments the accumulator counting the failed login attempts in the first stage. Because all conditions of the composite rule have not been satisfied (operation 235), and there is a second event to evaluate (operation 250), the rule evaluator 160 evaluates the second event next (operation 210). Upon evaluating the second event, the rule evaluator 160 determines that the first rule's condition is satisfied by the second event (operation 215), but not the second rule's condition. Then the rule evaluator 160 stores the second event in the state memory of the composite rule. Because the second event makes the event previously stored in the state memory of the composite rule no longer relevant toward satisfying all the threshold conditions of the composite rule, the event previously stored in the state memory of the composite rule is deleted, the accumulator indicating the number of failed login attempts in the first stage remains unchanged, and the start time of time of the relevant time window for the events to meet all threshold conditions is updated to the occurrence time of the first event that remains stored in the state memory of the composite rule (operation 220). Because all conditions of the rule have not been satisfied (operation 235), and there are no more events in the event list to evaluate (operation 250), the rule evaluator 160 saves the events stored in the state memory of the composite rule (operation 255) and the set of operations 200 of FIG. 2 ends.

In an example, a list of events in an event stream are associated with a composite rule that is triggered when there are two failed login attempts for a user of an application followed by a successful login attempt within ten seconds. The list of events includes events associated with a user "joe," events associated with a user "mary," and events associated with a user "tom." A first event in the list of events associated with the user "joe" may indicate a failed login attempt at five seconds, a second event in the list of events associated with the user "joe" may indicate a failed login attempt at six seconds, and a third event in the list of events associated with the user "joe" may indicate a successful login attempt at seven seconds. A first event in the list of events associated with the user "mary" may indicate a failed login attempt at seven seconds, a second event in the list of events associated with the user "mary" may indicate a successful login attempt at ten seconds, and a third event in the list of events associated with the user "mary" may indicate a failed login attempt at twelve seconds. A first event in the list of events associated with the user "tom" may indicate a failed login attempt at seven seconds, a second event in the list of events associated with the user "tom" may indicate a successful login attempt at ten seconds, a third event in the list of events associated with the user "tom" may indicate a successful login attempt at twelve seconds, and a fourth event in the list of events associated with the user "tom" may indicate a failed login attempt at fourteen seconds. The events for each of the users "joe," "mary," and "tom" may be included in respective separate event streams. The rule evaluator 160 may process the separate event streams separately and may process the separate event streams in parallel with one another. After evaluating the list of events associated with the user "joe" as described in the examples above, the rule evaluator 160 determines that all conditions of the composite rule have been satisfied (operation 235), the rule evaluator 160 issues a notice, alert, or alarm indicating that that composite rule conditions have been satisfied for the user "joe," and any stored events and associated variable and accumulator values are reset in the state memory of the composite rule (operation 240). The events that contributed to meeting the composite rule's final condition may be output along with the notice, alert, or alarm before being erased from the composite rule's state memory. Because there are no more events in the event list for user "joe" to evaluate (operation 250), and there are no remaining events in the state memory for the composite rule, no events are saved (operation 255) and the process ends.

The set of operations 200 of FIG. 2 continue with processing the event stream associated with the user "mary" in parallel with processing the event stream associated with the user "joe." After evaluating the list of events associated with the user "mary" as described in the examples above, the rule evaluator 160 determines that the final condition of the composite rule has not been satisfied (operation 235). Because the last of the three events in the list of events associated with the user "mary" meets a threshold condition of the rule (operation 215) but all the threshold conditions for the rule have not been met thereafter (operation 235), the last of the three events is saved for consideration during the next iteration over the list of events associated with the user "mary" associated with the next tumbling temporal window (operation 255).

The set of operations 200 of FIG. 2 continue with processing the event stream associated with the user "tom" in parallel with processing the event streams associated with the users "joe" and "mary." After evaluating the list of events associated with the user "tom" as described in the examples above, the rule evaluator 160 determines that the final condition of the rule has not been satisfied (operation 235). Because the second and third of the four events in the list of events associated with the user "tom" do not meet a rule condition (operation 215), the first through third of the four events in the list of events associated with the user "tom" are deleted and the rule evaluator 160 saves the last of the four events for consideration during the next iteration over the list of events associated with the user "tom" associated with the next tumbling temporal window (operation 255).

Continuing the present example, the set of operations 200 of FIG. 2 then begin anew with processing events associated with the next temporal tumbling window. At the beginning of the present execution of the process of FIG. 2, the composite rule still stores or is restored to store the events saved in the state memory of the composite rule during the last execution of the process, along with the corresponding variables and accumulator values that correspond to the events. The list of events for the next temporal tumbling window include events associated with the user "mary," and events associated with a user "alice." A first event in the list of events associated with the user "mary" may indicate a failed login attempt at thirteen seconds, a second event in the list of events associated with the user "mary" may indicate a successful login attempt at twenty one seconds, and a third event in the list of events associated with the user "mary" may indicate a failed login attempt at twenty five seconds. A sole event in the list of events associated with the user "alice" may indicate a failed login attempt at seventeen seconds. The composite rule still stores or is restored to store the events saved in the state memory of the composite rule during the last execution of the set of operations 200 of FIG. 2 for the previous tumbling temporal window, along with the variable and accumulator values that correspond to the events. These include the event associated with the user "mary" indicating a failed login attempt at twelve seconds. The events for each of the users "mary" and "alice" may be included in respective separate event streams. The rule evaluator 160 may process the separate event streams separately and may process the separate event streams in parallel with one another. After evaluating the list of events associated with the user "mary" as described in the examples above, the rule evaluator 160 determines that all conditions of the composite rule have been satisfied (operation 235) by the event associated with the user "mary" stored in the state memory of the rule in combination with the first two events associated with the user "mary" in the present tumbling temporal window. Thus, the rule evaluator 160 issues a notice, alert, or alarm indicating that the composite rule conditions have been satisfied. Because the last of the three events in the list of events associated with the user "mary" meets a rule condition of the composite rule (operation 215) but all the threshold conditions for the composite rule have not been met thereafter (operation 235), the last of the three events in the list of events associated with the user "mary" in the current tumbling temporal window is saved for consideration during the next iteration over the list of events associated with the user "mary" associated with the next tumbling temporal window (operation 255).

The set of operations 200 of FIG. 2 continue with processing the event stream associated with the user "alice" in parallel with processing the event stream associated with the user "mary." By evaluating the list of events associated with the user "alice" as described in the examples above, the rule evaluator 160 determines that the one event in the list of events associated with the user "alice" meets a rule condition of the rule (operation 215) but all the threshold conditions for the composite rule have not been met (operation 235). Therefore, the one event in the list of events associated with the user "alice" in the current tumbling temporal window is saved for consideration during the next iteration over the list of events associated with the user "alice" associated with the next tumbling temporal window (operation 255).

Figure 3:
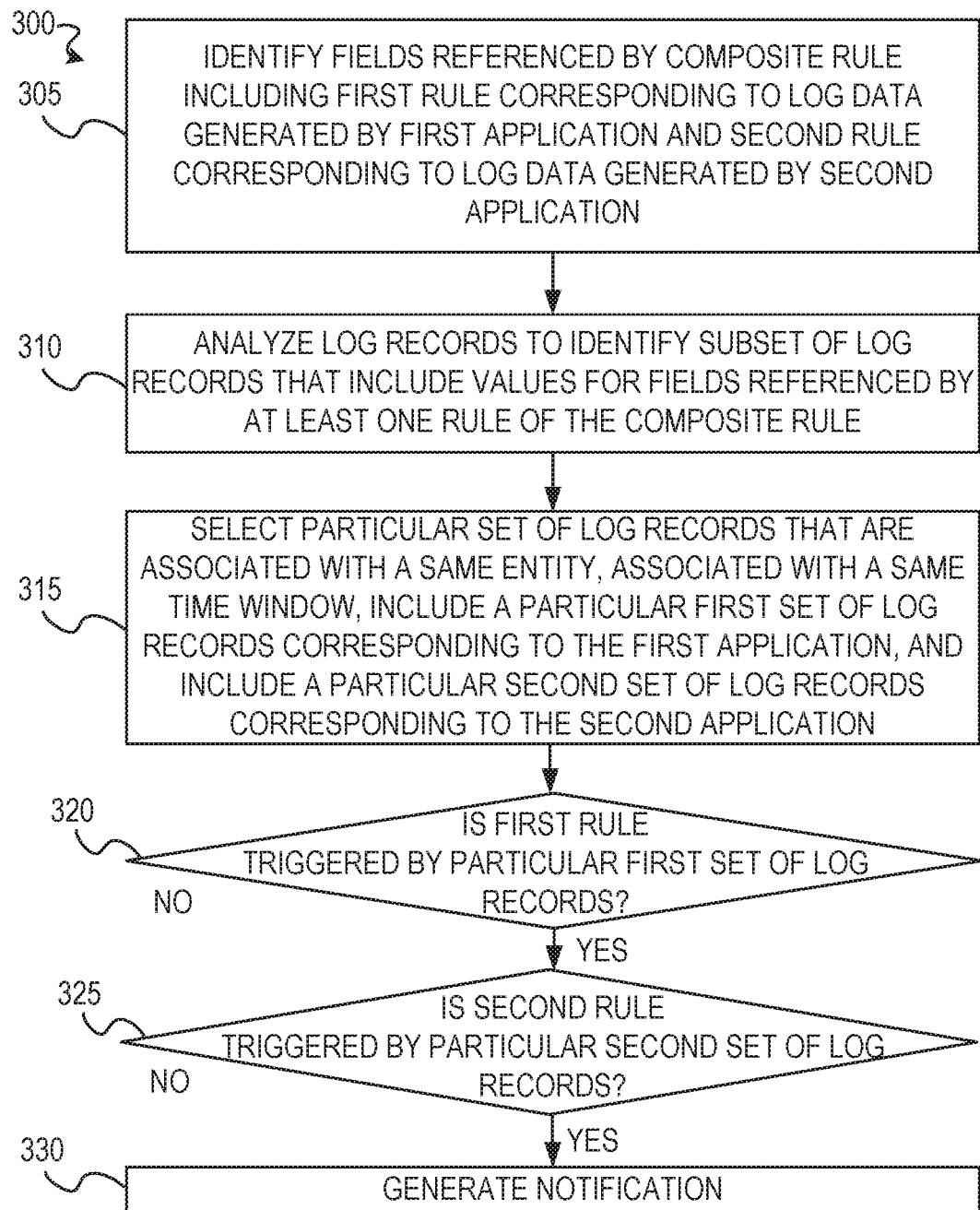
FIG. 3 shows a block diagram that illustrates an example set of operations for evaluating rules performed by a system for processing application logs in accordance with one or more embodiments.

FIG. 3 shows a block diagram that illustrates an example set of operations 300 for evaluating rules performed by the system 100 in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an operation 305, the system 100 identifies fields that are referenced by a composite rule. The composite rule includes a set of rules. In the example illustrated, a first rule corresponds to log data that is generated by a first target application, and a second rule corresponds to log data that is generated by a second target application. The different rules within the same composite rule may correspond to data stored in separate log files by separate applications. The fields may include at least one field included in the log file generated by the first target application and at least one field included in the log file generated by the second target application.

As an example, a user may create a composite rule and input the composite rule into the system 100 to detect failed repeated attempts to log into multiple target applications within a short period of time of five seconds in duration. The composite rule may be intended to detect and report a malicious attempt to access the target applications by an unauthorized user by hacking the login credentials of an authorized user. The composite rule may include a first rule that is satisfied when a data structure representing an event recorded in an application log file includes a field named "login-result" that includes a value "f" to indicate a failed login attempt and a field named "target" that includes a value corresponding to a name of the first application with which the first rule is associated. The composite rule may include a second rule that is satisfied when a data structure representing an event recorded in an application log file includes a field named "login-result" that includes a value "f" to indicate a failed login attempt and a field named "target" that includes a value corresponding to a name of the second application with which the second rule is associated. The system 100 may identify fields named "login-result" and "target" in a first event data structure and in a second event data structure, where the event data structures represent events recorded in corresponding application log files.

In an operation 310, the system 100 analyzes log records to identify a subset of log records that include values for fields referenced by at least one rule of the composite rule. The values of fields recorded in log records stored in log files may be stored in event data structures including data extracted from the log files. One event data structure may be created for each event recorded in a log file. The system 100 may analyze the event data structures to identify the subset of log records by comparing the names of the fields stored in the rules of the composite rule with the names of the fields stored in the event data structures. When the names of the fields match, the system 100 may determine that the event data structure having the matching field represents a log record stored in a corresponding log file that is included in the identified subset of log records.

Continuing the example, the system 100 may analyze a series of event data structures to look for event data structures that include a field named "login-result" and a corresponding value, where the field named "login-result" matches a field referenced the first rule and the second rule of the composite rule. The system 100 may include each event data structure that includes a field named "login-result" and a corresponding value in an identified subset of the event data structures to be analyzed further.

In an operation 315, the system 100 selects a particular set of log records from the subset of log records identified in operation 310 for evaluating the composite rule. The particular set of log records may be represented as a particular set of event data structures that include data extracted from log files including the log records. The particular set is identified and selected based in part on being associated with a same entity. The entity may include a user, a bot or automated program that acts like a user, or other entity that acts on or makes use of any target software application associated with the subset of log records. The particular set is also identified and selected based in part on being associated with a same time window. The time window may be chosen according to a time window specified by the composite rule. Each log record in the particular set may be chosen based in part on having a time of occurrence not greater than the length of the time window before or after any other log record in the particular set. The particular set of log records may include a first set of log records that correspond with the log file of the first application and a second set of log records that correspond with the log file of the second application. The system 100 may select the particular set of log records to use later for evaluation of the composite rule.

Continuing the example, the system 100 may analyze the identified subset of the event data structures to look for and select a particular set of event data structures from the identified subset that are all associated with a same user whose user login ID was used to attempt to log into the first and second applications. The particular set of event data structures may also be selected such that none of the event data structures are selected to be included in the particular set of event data structures unless they have an occurrence time that is not more than a length of the time window specified by the composite rule earlier or later than any of the event data structures included in the particular set of event data structures. The composite rule specifies the time window as five seconds, so none of the particular set of event data structures has a time of occurrence more than five seconds different from any of the other event data structures within the particular set of event data structures. As part of the particular set of event data structures, the system 100 may select a first set of event data structures that include a field named "target" having a value corresponding to the name of the first application with which the first rule is associated. Also, as part of the particular set of event data structures, the system 100 may select a second set of event data structures that include a field named "target" having a value corresponding to the name of the second application with which the second rule is associated.

In an operation 320, the system 100 determines whether the first rule is triggered, or satisfied, by the first set of log records. The system 100 may evaluate each event data structure in the first set of event data structures to determine whether the event data structure contributes toward triggering or satisfying the first rule. After evaluating all the event data structures in the first set of event data structures, the system 100 may determine whether the full first set of event data structures trigger or satisfy the first rule. When the first rule is determined to be triggered, operation 325 is performed next. Otherwise, the set of operations 300 completes without the composite rule being triggered or satisfied.

Continuing the example, all the rules in the composite rule require that they be met by a same user. The composite rule also has a specified time window of five seconds. The first rule in the composite rule requires that an event data structure have a field named "login-result" with a value of "f" indicating a failed login attempt to the first application. The system 100 evaluates all the event data structures of the first set of event data structures to detect a field named "login-result" that includes a value of "f" indicating a failed login attempt and to detect that in the same event data structure a field and value indicating that the first application generated the associated log record. When an evaluated event data structure of the set of first event data structures is detected as meeting the conditions of the first rule, operation 325 is performed. Otherwise, the set of operations 300 is completed without the composite rule being satisfied or triggered.

In an operation 325, the system 100 determines whether the second rule is triggered, or satisfied, by the second set of log records. The system 100 may evaluate each event data structure in the second set of event data structures to determine whether the event data structure contributes toward triggering or satisfying the second rule. After evaluating all the event data structures in the second set of event data structures, the system 100 may determine whether the full second set of event data structures trigger or satisfy the second rule. When the second rule is determined to be triggered, operation 330 is performed next. Otherwise, the set of operations 300 completes without the composite rule being triggered or satisfied.

Continuing the example, the second rule in the composite rule requires that an event data structure have a field named "login-result" with a value of "f" indicating a failed login attempt to the second application. The system 100 evaluates all the event data structures of the second set of event data structures to detect a field named "login-result" that includes a value of "f" indicating a failed login attempt and to detect that in the same event data structure a field and value indicating that the second application generated the associated log record. When an evaluated event data structure of the set of second event data structures is detected as meeting the conditions of the second rule, operation 330 is performed. Otherwise, the set of operations 300 is completed without the composite rule being satisfied or triggered.

In an operation 330, it is determined that the complete composite rule has been satisfied because all the individual rules, e.g., the first rule and the second rule, have been satisfied. Because the composite rule has been satisfied, the system 100 generates a notification based on the triggering or satisfaction of the conditions of the composite rule. The notification may include an alarm or an alert, for example, to another process or to a user. The alarm or alert may be in the form of a graphical user interface alert window, an email message, a text message, audible alarm, electronic signal, or inter process communication to another executing software process. In an embodiment, the other executing process may take action based on the notification. In an embodiment, the system 100 may output the particular set of log records corresponding to the first application and the particular set of log records corresponding to the second application.

Continuing the example, the satisfaction of both the first rule and the second rule indicate that a same user login credential was used to attempt to log into both the first application and the second application without success within the specified time window. Therefore, the system 100 generates a notification of the failed attempts at logging into the first and second applications. The notification may include a warning message on a GUI of a system administrator for the system 100, an email message or a test message to a system administrator of the system 100, or an electronic signal or message to a process for taking action based on the failed attempts at logging in. In an example, the system 100 may deactivate the user's login credentials on the first application and the second application so that no one can sign into the first application and the second application using the user's login credentials. In an example, the system 100 may output, e.g., to a text file, the user's login credentials used to attempt to log into the first application and the second application along with information identifying the first application and the second application, as well as the times of the failed attempts to log into the applications.

In various embodiments, the composite rule may include a third rule, and the third rule may also be required to be satisfied in order for the composite rule overall to be satisfied. For example, the third rule may specify a third application that records a log record into a third log file corresponding to the third application. The third log file includes a third set of log records corresponding to the third application. The recorded log records indicate a failed login attempt by the same user credentials as the first application and the second application within a same specified time window. When the system 100 identifies that the same user credentials that were used in a failed attempt to log into the first application and second application were also used in a failed attempt to log into the third application, the system 100 generates the notification of the failed login attempts.

4. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between the overlay nodes as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
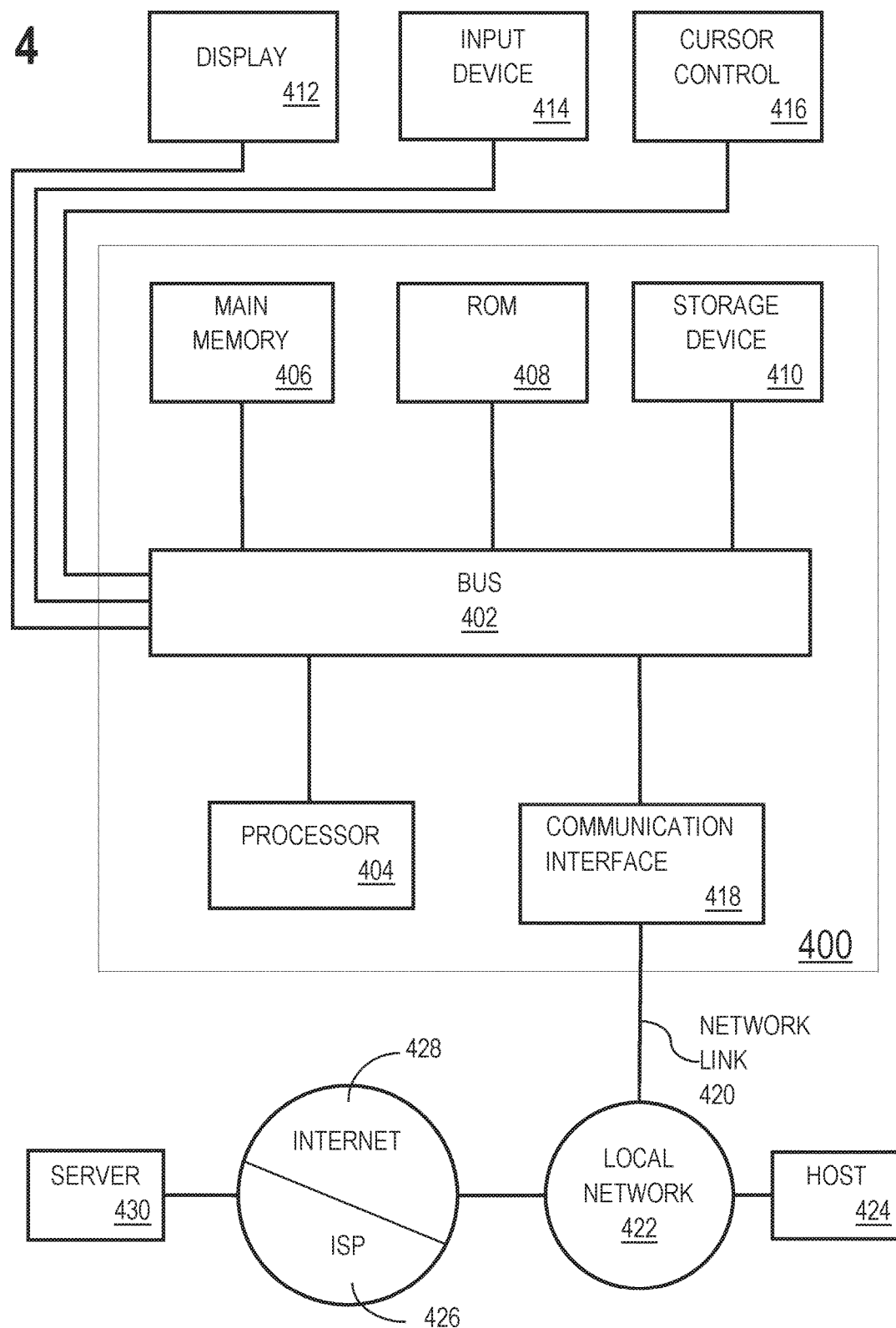
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into the remote computer's dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as the code is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable storage medium storing instructions, which when executed by one or more hardware processors, cause performance of operations comprising:
　　identifying a plurality of fields referenced by a composite rule comprising a first rule and a second rule, the first rule corresponding to log data generated during a first time window, the second rule corresponding to log data generated during a second time window, wherein the first time window is different than the second time window;
　　analyzing a plurality of log records to identify a subset of log records that include values for fields referenced by at least one rule of the composite rule;
　　selecting a first set of log records and a second set of log records from the subset of log records for evaluating the composite rule, the first set of log records being associated with the first time window and the second set of log records being associated with the second time window;
determining that the composite rule is triggered based on:
  determining that the first rule is triggered by the particular first set of log records associated with the first time window; and
  determining that the second rule is triggered by the particular second set of log records associated with the second time window; and
generating a notification based on the triggering of the composite rule,
wherein the first time window and the second time window correspond to non-overlapping windows of time.

2. The non-transitory computer-readable storage medium of claim 1, wherein the log data comprises first log data generated by a first application and second log data generated by a second application.

3. The non-transitory computer-readable storage medium media of claim 1, wherein the at least one application and the corresponding log data are associated with a single entity.

4. The non-transitory computer-readable storage medium of claim 1, wherein the first time window and the second time window are windows of a same size in a particular set of tumbling temporal windows.

5. The non-transitory computer-readable storage medium of claim 1, wherein the first time window and the second time window are adjacent time windows.

6. The non-transitory computer-readable storage medium of claim 1, wherein determining that the composite rule is triggered further comprises:
identifying a first event in the first time window that triggers the first rule;
setting a first accumulator to indicate that the first rule is triggered;
comparing a value stored in the first accumulator to a first threshold value;
responsive to determining that the value stored in the first accumulator meets the first threshold value, identifying a second event in the second time window that triggers the second rule;
updating a second accumulator to indicate that the second rule is triggered; and
generating the notification based on the updating the second accumulator.

7. The non-transitory computer-readable storage medium of claim 6, further comprising transmitting the generated notification and including in the transmitted notification a description of the first event and a description of the second event.

8. A method comprising:
identifying a plurality of fields referenced by a composite rule comprising a first rule and a second rule, the first rule corresponding to log data generated during a first time window, the second rule corresponding to log data generated during a second time window, wherein the first time window is different than the second time window;
analyzing a plurality of log records to identify a subset of log records that include values for fields referenced by at least one rule of the composite rule;
selecting a first set of log records and a second set of log records from the subset of log records for evaluating the composite rule, the first set of log records being associated with the first time window and the second set of log records being associated with the second time window;
determining that the composite rule is triggered based on:
  determining that the first rule is triggered by the particular first set of log records associated with the first time window; and
  determining that the second rule is triggered by the particular second set of log records associated with the second time window; and
generating a notification based on the triggering of the composite rule,
wherein the first time window and the second time window correspond to non-overlapping windows of time.

9. The method of claim 8, wherein the log data comprises first log data generated by a first application and second log data generated by a second application.

10. The method of claim 8, wherein the at least one application and the corresponding log data are associated with a single entity.

11. The method of claim 8, wherein the first time window and the second time window correspond to windows of a same size in a particular set of tumbling temporal windows.

12. The method of claim 8, wherein the first time window and the second time window are adjacent time windows.

13. The method of claim 8, wherein determining that the composite rule is triggered further comprises:
identifying a first event in the first time window that triggers the first rule;
setting an accumulator to indicate that the first rule is triggered;
identifying a second event in the second time window that triggers the second rule;
updating the accumulator to indicate that the second rule is triggered; and
generating the notification based on the updated accumulator.

14. The method of claim 13, further comprising transmitting the generated notification and including in transmitted notification a description of the first event and a description of the second event.

15. A system comprising:
at least one device including a hardware processor;
the system being configured to perform operations comprising:
  identifying a plurality of fields referenced by a composite rule comprising a first rule and a second rule, the first rule corresponding to log data generated during a first time window, the second rule corresponding to log data generated during a second time window, wherein the first time window is different than the second time window;
  analyzing a plurality of log records to identify a subset of log records that include values for fields referenced by at least one rule of the composite rule;
  selecting a first set of log records and a second set of log records from the subset of log records for evaluating the composite rule, the first set of log records being associated with the first time window and the second set of log records being associated with the second time window;
  determining that the composite rule is triggered based on:
    determining that the first rule is triggered by the particular first set of log records associated with the first time window; and determining that the second rule is triggered by the particular second set of log records associated with the second time window; and generating a notification based on the triggering of the composite rule, wherein the first time window and the second time window correspond to non-overlapping windows of time.

16. The system of claim 15, wherein the log data comprises first log data generated by a first application and second log data generated by a second application.

17. The system of claim 15, wherein the at least one application and the corresponding log data are associated with a single entity.

18. The system of claim 15, wherein the first time window and the second time window correspond to windows of a same size in a particular set of tumbling temporal windows.

19. The system of claim 15, wherein the first time window and the second time window are adjacent time windows.

20. The system of claim 15, further comprising transmitting the generated notification.

\* \* \* \* \*

UNITED STATES PATENT AND TRADEMARK OFFICE
CERTIFICATE OF CORRECTION

PATENT NO.        : 11,288,165 B2
APPLICATION NO.   : 17/219122
DATED             : March 29, 2022
INVENTOR(S)       : Chatterjee et al.

Page 1 of 1

It is certified that error appears in the above-identified patent and that said Letters Patent is hereby corrected as shown below:

In the Specification

In Column 5, Line 48, delete ""service":" and insert -- "service" : --, therefor.

In Column 6, Line 40, delete "RuleGroup 1" and insert -- RuleGroup { --, therefor.

In Column 6, Line 46, delete "Join: l {" and insert -- Join: { --, therefor.

In Column 6, Line 47, delete "ru1e2." and insert -- rule2. --, therefor.

In Column 11, Line 46, delete "do" and insert -- to --, therefor.

In the Claims

In Column 31, Line 22, in Claim 3, delete "media of" and insert -- of --, therefor.

Signed and Sealed this
Sixteenth Day of August, 2022

Katherine Kelly Vidal
*Director of the United States Patent and Trademark Office*